United States Patent [19]

Kanda

[11] Patent Number: 5,524,179
[45] Date of Patent: Jun. 4, 1996

[54] FUZZY INFERENCE PROCESSING APPARATUS

[75] Inventor: Masae Kanda, Kawagoe, Japan

[73] Assignee: Kabushiki Kaisha Toshiba, Kawasaki, Japan

[21] Appl. No.: 53,673

[22] Filed: Apr. 29, 1993

[30] Foreign Application Priority Data

Jul. 10, 1992 [JP] Japan .................................. 4-183657

[51] Int. Cl.⁶ .............................. G06F 13/00; G06F 9/44
[52] U.S. Cl. .................. 395/51; 395/3; 395/900
[58] Field of Search ................... 395/3, 51, 900, 395/61

[56] References Cited

U.S. PATENT DOCUMENTS

| | | | |
|---|---|---|---|
| 5,036,730 | 8/1991 | Sakai et al. | 395/900 |
| 5,131,071 | 7/1992 | Tsutsumi et al. | 395/3 |
| 5,167,005 | 11/1992 | Yamakawa | 395/3 |
| 5,202,954 | 4/1993 | Miyazawa et al. | 395/3 |
| 5,280,566 | 1/1994 | Nakamura | 395/61 |
| 5,335,314 | 8/1994 | Tsutsumi et al. | 395/900 |
| 5,343,553 | 8/1994 | Miyazawa et al. | 395/3 |

FOREIGN PATENT DOCUMENTS

| | | | |
|---|---|---|---|
| 2-93904 | 4/1990 | Japan | G05B 13/00 |
| 2-93905 | 4/1990 | Japan | G05B 13/00 |
| 2-93902 | 4/1990 | Japan | G05B 13/00 |
| 2270030 | 11/1990 | Japan | G06F 9/44 |

OTHER PUBLICATIONS

Mamdani, E. H., "Application of Fuzzy Algorithms for Control of Simple Dynamic Plant," Proc. IEEE, vol. 121, No. 12, Dec. 1974, 1585–1588.

Chiu, et al, "Real–Time Fuzzy Control; From Linguistic Rules to Implementation on a Chip," Methodologies for Intelligent Systems; Proc., Oct. 1987, 17–24.

Mizumoto, M., "Realization of PID Controls by Fuzzy Control Methods", IEEE Int'l. Conf. on Fuzzy Systems, Mar. 1992, 709–715.

*Primary Examiner*—Robert W. Downs
*Attorney, Agent, or Firm*—Oblon, Spivak, McClelland, Maier & Neustadt

[57] ABSTRACT

A fuzzy inference processing apparatus based on fuzzy rules represented by an if-then notation comprises a CPU having a software for obtaining grades of if-part membership functions with respect to input variables for each rule and a hardware for obtaining a truth value of the if-part of each rule, a truth value of the then-part of each rule, and an inference result. The hardware comprises a predetermined number of then-part membership function calculators for respectively storing the then-part membership functions defined in the then-part of the rules, minimum calculators respectively connected to the then-part membership function calculators, and a maximum calculation circuit connected to all the then-part membership function calculators. The CPU supplies the grades of the if-part membership functions for each rule to one of the minimum calculators which is connected to the then-part membership function calculator storing the then-part membership function defined in the then-part of the rule. The CPU outputs a predetermined number of grade regardless of the number of the input variables defined in the rule. The grade of the membership function is set to 1 where the input variable is not defined in the rule.

14 Claims, 7 Drawing Sheets

FUZZY INFERENCE PROCESSING APPARATUS

BACKGROUND OF THE INVENTION

1. Field of the Invention

The present invention relates to a fuzzy inference processing apparatus for performing fuzzy inferences.

2. Description of the Related Art

Many proposals concerning fuzzy inference processing apparatuses, such as fuzzy control apparatuses and fuzzy computers, have been conventionally made in a variety of literature.

For example, fuzzy inference processing apparatuses formed of an analog circuit are described in Published Unexamined Japanese Patent Application Nos. 2-93902, 2-93904, 2-93905, and 2-270030. Published Unexamined Japanese Patent Application No. 2-93902 discloses an analog fuzzy controller for outputting a fuzzy inference result by using signal lines in a number equal to the number of then-part membership functions to a deffuzification section in order to reduce the number of connector pins of the package when the controller is to be formed an IC. Published Unexamined Japanese Patent Application No. 2-93904 discloses a fuzzy control apparatus with an improvement responsibility of a closed loop control, i.e., a fuzzy control apparatus capable of following with a sufficient accuracy even target values changing with time, by obtaining a control signal using a fuzzy inference upon the change in the target signal. Published Unexamined Japanese Patent Application No. 2-93905 discloses a fuzzy control apparatus for performing control of a closed loop system with a short dead time and a small overshoot by determining the history of the control signal and correcting the control signal in accordance with the determination result. Published Unexamined Japanese Patent Application No. 2-270030 discloses a fuzzy processing apparatus capable of reducing the scale of circuits by performing multiplications, instead of minimum calculations between the grade of the if-part membership functions.

These fuzzy inference processing apparatuses disclosed in the above literature are formed of hardware so that they can perform high-speed inference calculations. However, these apparatuses are poor in flexibility and hence cannot easily correspond to changes in the fuzzy rule including changes in the number of input variables, the definition of the membership functions, and in the number of rules.

In order to overcome the above drawbacks, there is proposed a fuzzy inference processing apparatus that executes fuzzy inferences by software. In a fuzzy inference performed by software, however, if an inference mechanism is sophisticated or the number of data to be processed is large, the inference calculation speed undesirably becomes very low.

As described above, either of these two types of apparatuses has both advantages and disadvantages. In conventional fuzzy inference apparatuses, therefore, a system is constructed by one of software and hardware in accordance with the intended use, the object to be controlled, and the like. This gives rise to conflicting problems: if the inference speed of the system is increased, its flexibility is decreased; if the flexibility of the system is pursued, its inference speed is sacrificed.

SUMMARY OF THE INVENTION

It is an object of the present invention to provide a fuzzy inference processing apparatus capable of realizing both a high flexibility and a high calculation speed of a system.

It is another object of the present invention to provide a fuzzy control apparatus capable of realizing both a high flexibility and a high calculation speed of a system.

A fuzzy inference processing apparatus according to the present invention comprises:

first means for calculating $_m$ grades of if-part membership functions with respect to $_m$ input variables for each rule, the first means outputs grade of 1 where the input variable is not defined in the rule;

first synthesizing means, connected to said first means, for synthesizing the m grades of the if-part membership functions of each rule to obtain a truth value of the if-part of each rule;

second means storing then-part membership functions for receiving the truth value of the if-part of each rule obtained by said first synthesizing means and calculating a truth value of the then-part of the rule; and second synthesizing means, connected to said second means, for synthesizing the truth values of the then-part of all the rules to obtain an inference result.

A fuzzy control apparatus according to the present invention comprises:

first means for calculating $_m$ grades of if-part membership functions with respect to $_m$ input variables for each rule, the first means outputs grade of 1 where the input variable is not defined in the rule;

first synthesizing means, connected to said first means, for synthesizing the $_m$ grades of the if-part membership functions of each rule to obtain a truth value of the if-part of each rule;

second means storing then-part membership functions for receiving the truth value of the if-part of each rule obtained by said first synthesizing means and calculating a truth value of the then-part of the rule;

second synthesizing means, connected to said second means, for synthesizing the truth values of the then-part of all of the rules to obtain an inference result; and deffuzification means for converting the inference result to a crisp value.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a fuzzy inference processing apparatus according to the present invention will now be described with reference to the accompanying drawings.

First, an outline of a fuzzy inference will be described. The fuzzy inference is an inference using fuzzy rules expressed in ambiguous words that are used in everyday life of human being. The fuzzy rule can be described like "if $x_1$ is $A_{11}$ and $x_2$ is $A_{12}$ then y is $B_1$," in which each of $x_1$ and $x_2$ is an input variable, and y is an output variable. $A_{11}$, $A_{12}$, and B are fuzzy sets. The numbers of input variables and output variables are not limited to two and one, respectively, and so a plurality of output variables may exist. In addition, the number of rules is not limited to one; normally, a plurality of rules are defined. A part "if $x_1$ is $A_{11}$ and $x_2$ is $A_{12}$" in which the condition of establishment of the rule is written is called an antecedent clause or if-part, and the consequent part "then y is $B_1$" in which the consequent of the rule is written is called a conclusion clause or then-part. The fuzzy inference is executed by converting the degree of matching the input variable to the fuzzy set into a value of 0 to 1, and a membership function defines this conversion. The membership function expresses a relationship between the input variable and the degree of matching, called grade. If a plurality of input variables are present in the if-part of one rule, a truth value of the if-part of that rule is obtained by synthesizing the grades of a plurality of input variables. There are many synthesis methods, for example, a max-min synthesis method is well known. In the max-min synthesis method, a minimum value of a plurality of grades of the if-part membership functions is obtained as the truth value of the if-part of the rule. A truth value of the then-part of the rule is obtained based on the then-part membership function and the truth value of the if-part of the rule. The truth value of the then-part of the rule is a fuzzy set. If a plurality of rules are defined, an inference result is obtained by synthesizing the truth values of the then-part of all the rules. In the max-min synthesis method, a maximum operation (logical addition) is performed to synthesize the truth values of the then-part of all the rules.

The truth value of the then-part is a fuzzy set, therefore, if the inference result is to be used in a subsequent processing apparatus or the like, it is necessary to interpret the truth value of the then-part, i.e., to convert the fuzzy set into a crisp value. This conversion is called deffuzification. One example of the deffuzification is to calculate the center-of-gravity of the fuzzy set as the crisp value.

Figure 1:
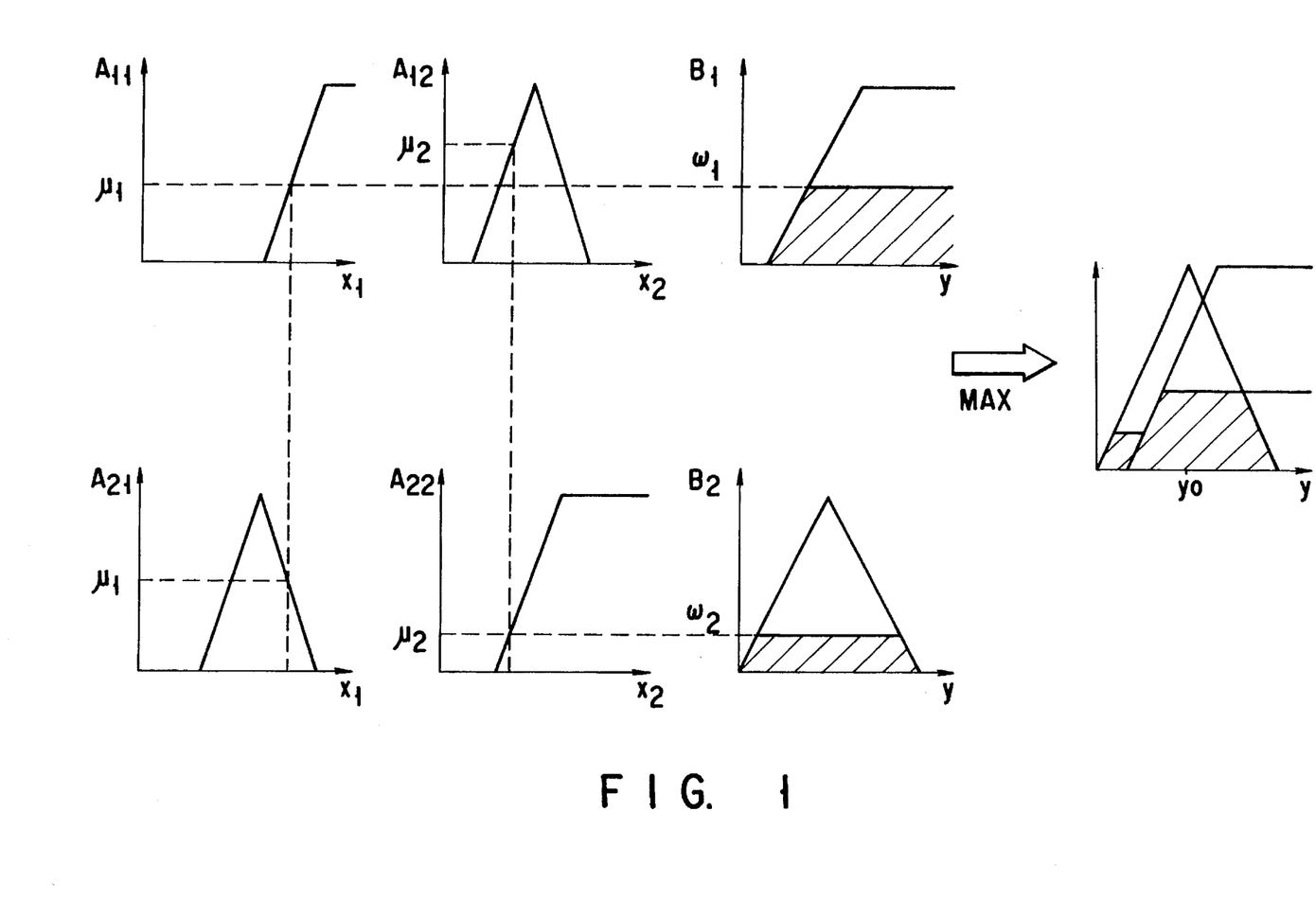
FIG. 1 is a view showing the concept of a fuzzy inference.

FIG. 1 shows an overview of a fuzzy inference in which the number of rules is two, the number of input variables is two, and the number of output variables is one, for simplicity.

Though the max-min synthesis method is described as a synthesizing method of the rules, other synthesis methods can be also used. For example, there are a max-product synthesis method in which a minimum calculation for synthesizing the if-parts in the max-min synthesis method is replaced by a multiplication and a sum-product synthesis method in which a maximum calculation for synthesizing the then-parts in the max-product synthesis method is replaced by an addition.

Figure 2:
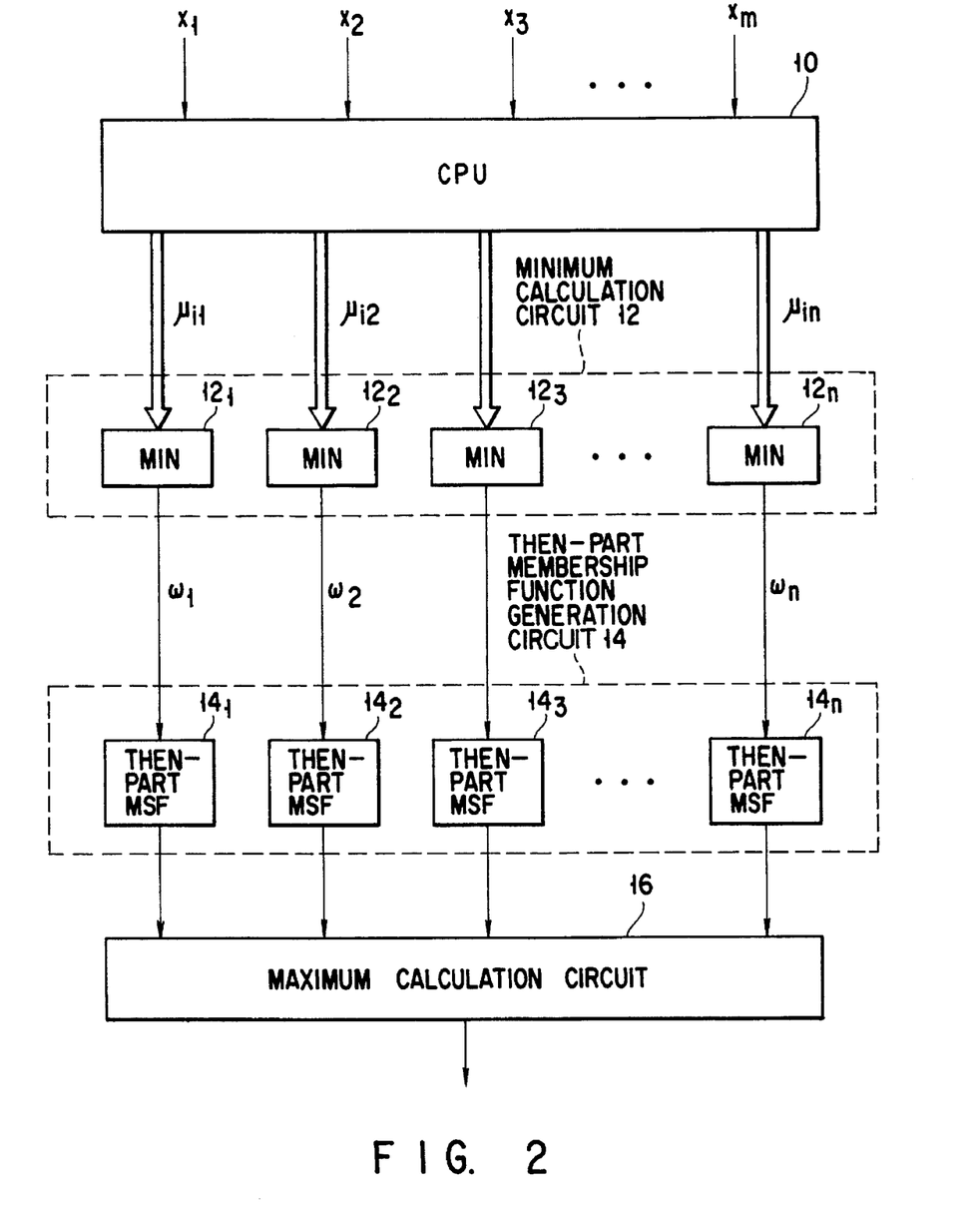
FIG. 2 is a block diagram showing a fuzzy inference processing apparatus as a first embodiment according to the present invention.

FIG. 2 is a block diagram showing the overall arrangement of the first embodiment of a fuzzy inference processing apparatus according to the present invention. The present invention is characterized in that the processing apparatus is constituted by a software and a hardware. More particularly, the grades of the if-part membership functions are calculated by a software and supplied to a hardware portion. The hardware portion includes a section for calculating the minimum value of the grades of the if-part membership functions as the truth value of the if-part of the rule, a section for calculating the truth value of the then-part of the rule, and a section for calculating the inference result (the maximum value of the truth value of the then-part). The hardware has a limit in the number m of the input variables and the number n of the then-part membership functions. However, this limit is an upper limit and a fuzzy inference with smaller numbers of input variables and then-part membership functions can be performed by the same hardware. Since the grade of the if-part membership function is calculated by a software, it is possible to change the fuzzy rule including the change in the definition of the if-part membership function by merely rewriting the software.

The fuzzy rules defined in the present invention is generally expressed as follows.

R1: IF $x_1$ is $A_{11}$ and $x_2$ is $A_{12}$ and . . . $x_m$ is $A_{1m}$
THEN y is $B_3$
R2: IF $x_1$ is $A_{21}$ and $x_2$ is $A_{22}$ and . . . $x_m$ is $A_{2m}$
THEN y is $B_{n-1}$
Rk: IF $x_1$ is $A_{k1}$ and $x_2$ is $A_{k2}$ and . . . $x_m$ is $A_{km}$
THEN y is $B_2$ The then-part membership function is selected from the membership functions $B_1$ to $B_n$. It is possible to use the same membership function in plural rules. There is no limit in number of the rules. Further, it is not necessary to use all the input variables for each rule. The grade of the if-part membership function when no input variable is input is set to the maximum value (=1) due to a reason described later.

The input signals $x_i$ (i=1 to m) which are $_m$ in number are input to a central processing unit (CPU) 10. The grades μ of the if-part membership functions for the input variables of each rule are calculated according to a software of the CPU 10 and are output. It is noted that the input variables can take various values, they are linearized to fall within a predetermined range in which the if-part membership functions are defined. The linearization may be performed by the CPU 10 or an external section before the input variables are inputted to the CPU 10. The CPU 10 has n output terminals j (j=1 to n) which are respectively corresponding to the then-part membership functions and output the grades μ of the if-part membership functions of each rule through that output terminal which corresponds to the then-part membership function of that rule. Stated another way, the following hardwares are provided in units of the then-part membership functions.

A minimum calculation circuit 12 is formed of minimum calculators $12_j$ (j=1 to n) provided for each of the then-part membership functions and calculates the minimum value $\omega_j$ of the grades $\mu_{ij}$ of the if-part membership functions of each rule. For example, the then-part membership function of a rule is $B_1$, the CPU 10 supplies the grades $\mu_{il}$ (i=1 to m) of the if-part membership functions of the rule to the first minimum calculator $12_1$.

The output of the minimum calculation circuit 12 is supplied to a then-part membership function generation circuit 14. The then-part membership function generation circuit 14 is formed of then-part membership function generators $14_j$ provided for each of the then-part membership functions and calculates the truth value of the then-part membership function. The truth values of the then-part membership functions of a rule are supplied to a maximum calculation circuit 16.

The CPU 10 also calculates the grades of the if-part membership functions of other rules and outputs the grades to the minimum calculator $12_j$ which corresponds to the then-part membership function of the rule. Similarly, the truth value of the then-part membership function of the rule is calculated. When the truth values of the then-part membership functions of all the rules are calculated, the logical sum of the truth values of the then-part membership functions of all the rules is calculated as an inference result by the maximum calculation circuit 16.

Figure 3:
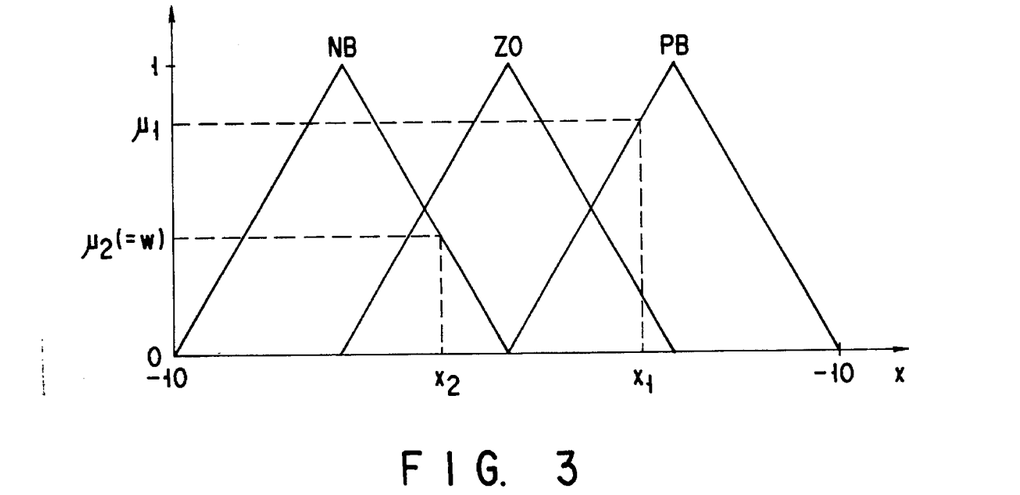
FIG. 3 shows if-part membership functions used in the first embodiment.
Figure 4:
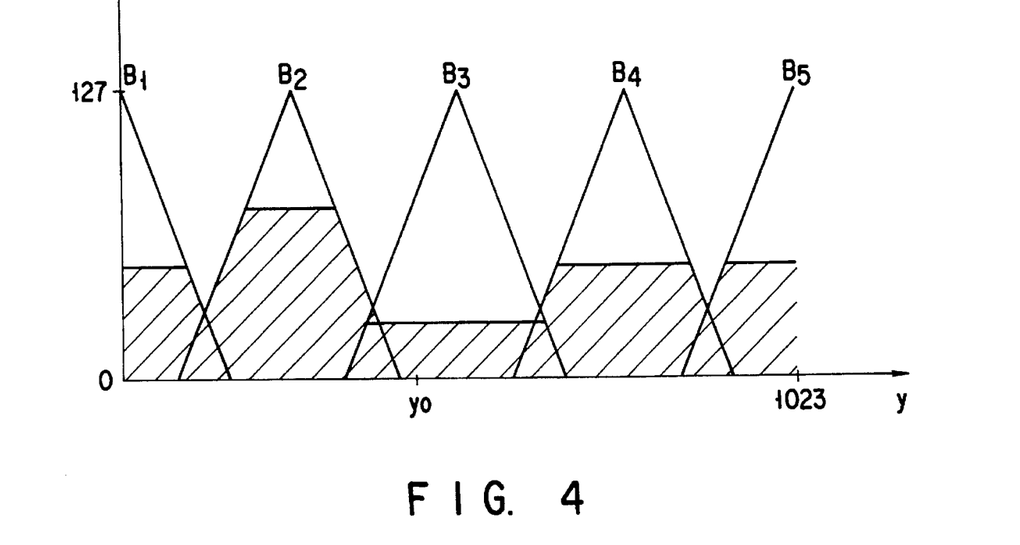
FIG. 4 shows then-part membership functions used in the first embodiment.

The operation of the first embodiment will be described. Though the hardware shown in FIG. 2 includes $_m$ input terminals and n then-part membership functions, it will be described a case in which the number m of the input variables is two, the number of the if-part membership functions is three (PB: Positive Big, ZO: Zero, NB: Negative Big) as shown in FIG. 3, and the number n of the then-part membership functions B is five as shown in FIG. 4. It is noted that the shape of each membership function is not limited to a triangle but may be a temple bell shape. In addition, the shape of each function need not be symmetrical and may be a trapezoid with a flat peak. Furthermore, neighboring functions may not overlap each other. According to the first embodiment, the following rules are defined by the software in the CPU 10.

R1: IF $x_1$ is PB and $x_2$ is NB THEN y is $B_1$
R2: IF $x_2$ is PB THEN y is $B_5$
R3: IF $x_1$ is ZO and $x_2$ is PB THEN y is $B_4$
...

The input variables are linearized to fall within a predetermined range of −10 to +10 and input variables $x_1$ and $x_2$ are respectively 3 and −2. The grades $\mu_1$ and $\mu_2$ of the if-part membership functions of the rule R1 are 0.8 and 0.4. All the grades of the if-part membership functions for the other input variables are 1. Since the then-part membership function of the rule R1 is $B_1$, the CPU 10 supplies the grades $\mu_{il}$ (i=1 to m) of the if-part membership functions of the rule R1 to the first minimum calculator $12_1$. The reason for setting the grade to 1 when the input variable is not defined is to neglect that grade upon minimum calculation.

Similarly, the CPU 10 supplies the grades of the if-part membership functions for the other rules to the minimum calculator corresponding to the then-part membership function. Though only five then-part membership functions are defined, the CPU 10 supplies 0 as the grades of the if-part membership functions to the minimum calculators $12_6$ to $12_n$. The reason for supplying the grades of 0 to the minimum calculators $12_6$ to $12_n$ is to neglect these grades upon maximum calculation.

Each of the minimum calculators $12_j$ (j=1 to n) receives the grades $\mu_{ij}$ (i=1 to m) of the if-part membership functions of each rule and calculates the minimum value $\omega_j$ thereof as the truth value of the if-part of the rule. For example, $\mu_{11}$=0.8, $\mu_{21}$=0.4, $\mu_{31}$ to $\mu_{m1}$=1 in the case of the rule R1, $\mu_{21}$=0.4 is output as the truth value $\omega_j$ of the if-part. Similarly, the minimum values of the grades of the if-part membership functions of other rules are calculated as the truth values $\omega_j$. Note that the minimum calculators $12_6$ to $12_n$ to which the grades of 0 are supplied may select any grade since this value is neglected upon the maximum calculation, however, for convenience, output the grade $\mu_1$ as the minimum.

The truth value $\omega_j$ is supplied to the then-part membership function generator $14_j$ which generates the truth value of the then-part based on the truth-value $\omega_j$ of the if-part of the rule and the then-part membership function $B_j$. The truth value of the then-part of the rule is a fuzzy set as shown by hatched lines in FIG. 4.

Similarly, all the truth values of the if-part of the rules and all the truth values of the then-part of the rules are calculated. The logical sum of the truth values of the then-part membership functions of all the rules is calculated as an inference result by the maximum calculation circuit 16.

There will be described an operation of the case in which the rule is changed by rewriting the software in the CPU 10. If the number of the rules is increased, the above operations are simply repeated by the number of the rules. The maximum calculation circuit 16 successively obtains the maximum of the truth values of the then-part of the rules. Therefore, it is not necessary to change the hardware. Even if the definition of the rules is changed, since the CPU 10 supplies the grades $\mu_i$ of the if-part membership functions of each rule to the minimum calculator $12_j$ which corresponds to the then-part membership function of that rule, the max-min synthesis can be similarly performed by the same hardware. For example, it is possible to increase the number of the input variables up to m.

In the first embodiment, the hardwares are paralleled in accordance with the then-part membership functions since the calculation is performed in the unit of the rule. However, if the number of the input variables is less than half of m and the number of the then-part membership functions is less than half of n, it is possible to perform the calculations for several rules though the definition of the then-part membership function of the then-part membership function generators $14_1$ to $14_n$ is changed. For example, if the output terminals of the CPU 10, the minimum calculators, and the then-part membership function generators are divided into two groups, it is possible to simultaneously perform the calculations for two rules by the respective group. Note that it is not necessary to divide the maximum calculation circuit 16 into two groups.

According to the first embodiment as described above, it is possible to perform the fuzzy inference without changing the hardware formed of the minimum calculation circuit 12, the then-part membership function generation circuit 14, and the maximum calculation circuit 16 even if the definition of the rule is changed. This makes it possible to increase the speed of the inference processing while maintaining high flexibility of the system. In particular, since the max-min synthesis calculation can be realized by exclusive calculation circuits, inference calculations can be performed at a very high speed. In addition, the grade of the if-part membership function is calculated by a software, the rules can be freely and easily changed.

Other embodiments of the present invention will be described below. In the description of the other embodiments, the same reference numerals as in FIG. 2 denote the corresponding parts and a detailed description thereof will be omitted.

Figure 5:
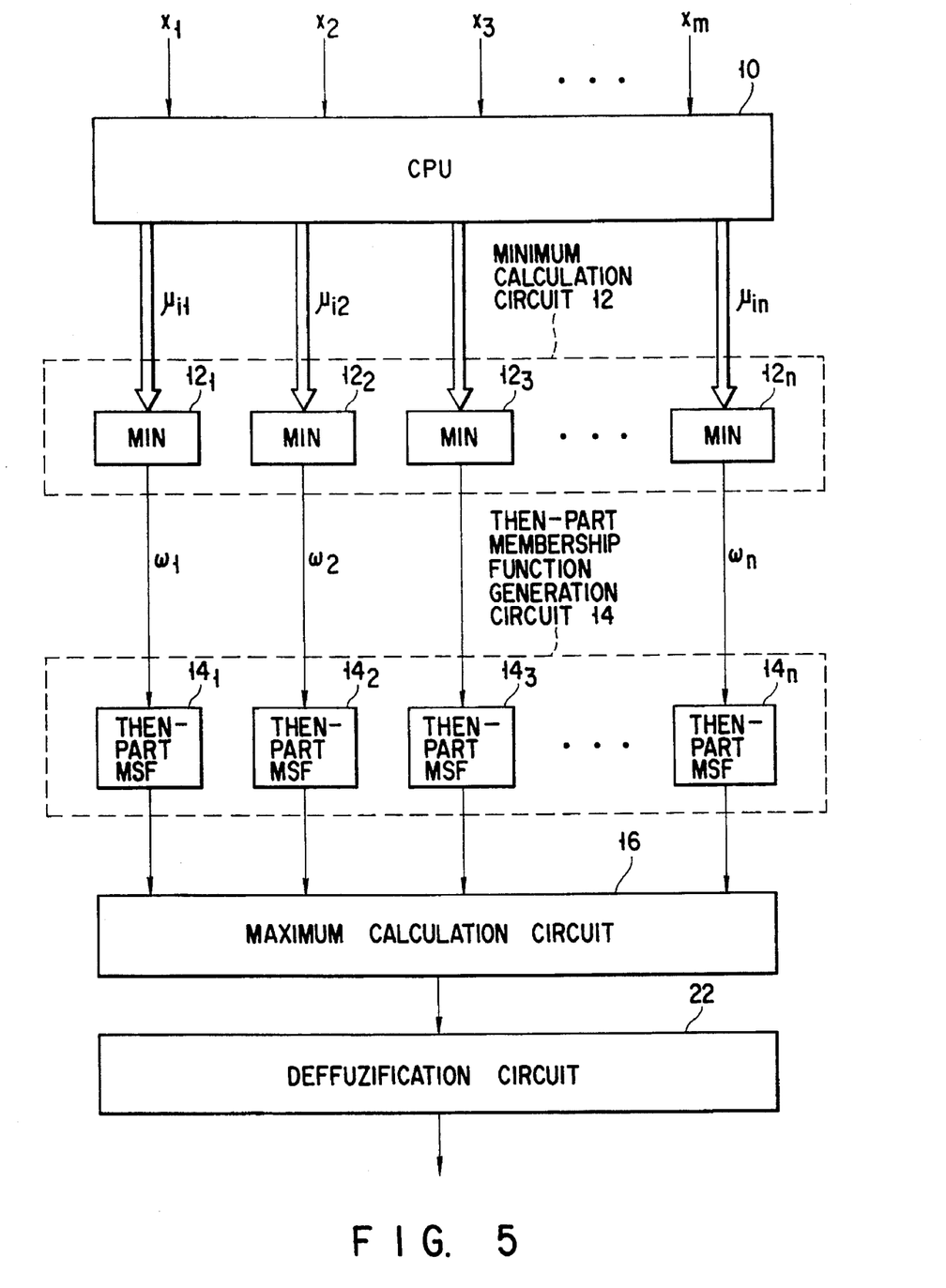
FIG. 5 is a block diagram showing a fuzzy control apparatus as a second embodiment according to the present invention.

FIG. 5 is a block diagram showing a fuzzy control apparatus according to a second embodiment. This fuzzy control apparatus is additionally provided with a defuzzification (or interpretation) circuit 22 for converting the inference result (fuzzy set), as the output from the maximum calculation circuit 16 of the fuzzy inference processing apparatus shown in FIG. 2, into a crisp numerical value.

Figure 6:
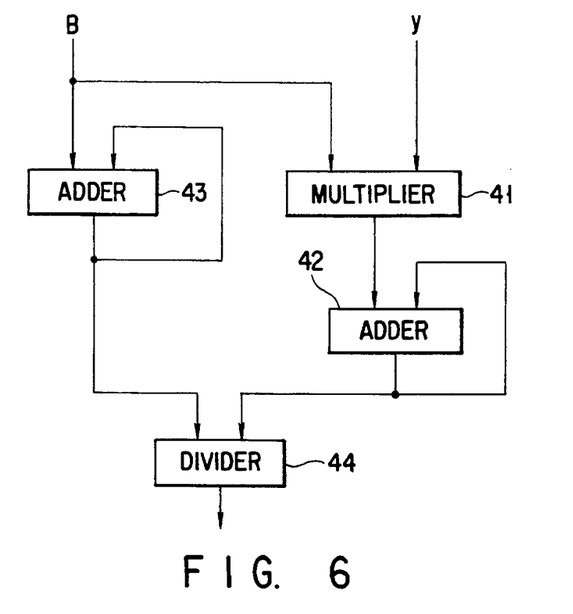
FIG. 6 is a detailed block diagram showing a defuzzification circuit of the second embodiment.

FIG. 6 shows the details of the defuzzification circuit 22. Assume that an inference result B output from the maximum calculation circuit 16 is represented by a hatched portion shown in FIG. 4. Assume also that the abscissa represents a 10-bit variable y and the ordinate represents a 7-bit variable B. A crisp value $Y_0$, as the inference result is represented by Equation (1) below:

$$Y_0 = (\int y \cdot B dy)/(\int B dy) \tag{1}$$

Equation (1) is a calculation for obtaining the center of weight of the inference result. A multiplier 41 and an adder 42 calculates the area of the inference result B which is the numerator of Equation (1). An adder 43 accumulates the inference result B and obtains the denominator of Equation (1). A divider 44 divides the output from the adder 42 by the output from the adder 43, and obtains the crisp value $Y_0$ of the inference result.

According to the second embodiment, the system is additionally provided with the defuzzification circuit 22 for converting the inference result, as the fuzzy set obtained by the maximum calculation circuit 16, into the crisp value $Y_0$, as an actual physical quantity, by using the defuzzification algorithm (the center-of-gravity method). Therefore, the second embodiment has an effect of inputting the inference result directly to a subsequent control apparatus or the like, in addition to the effect of the first embodiment. This defuzzification is conventionally the most time-consuming part among different parts of calculations. The architecture of this embodiment, however, realizes this part by hardware (the deffuzification circuit 22 shown in FIG. 6), thus calculations at higher speed can be expected.

Figure 7:
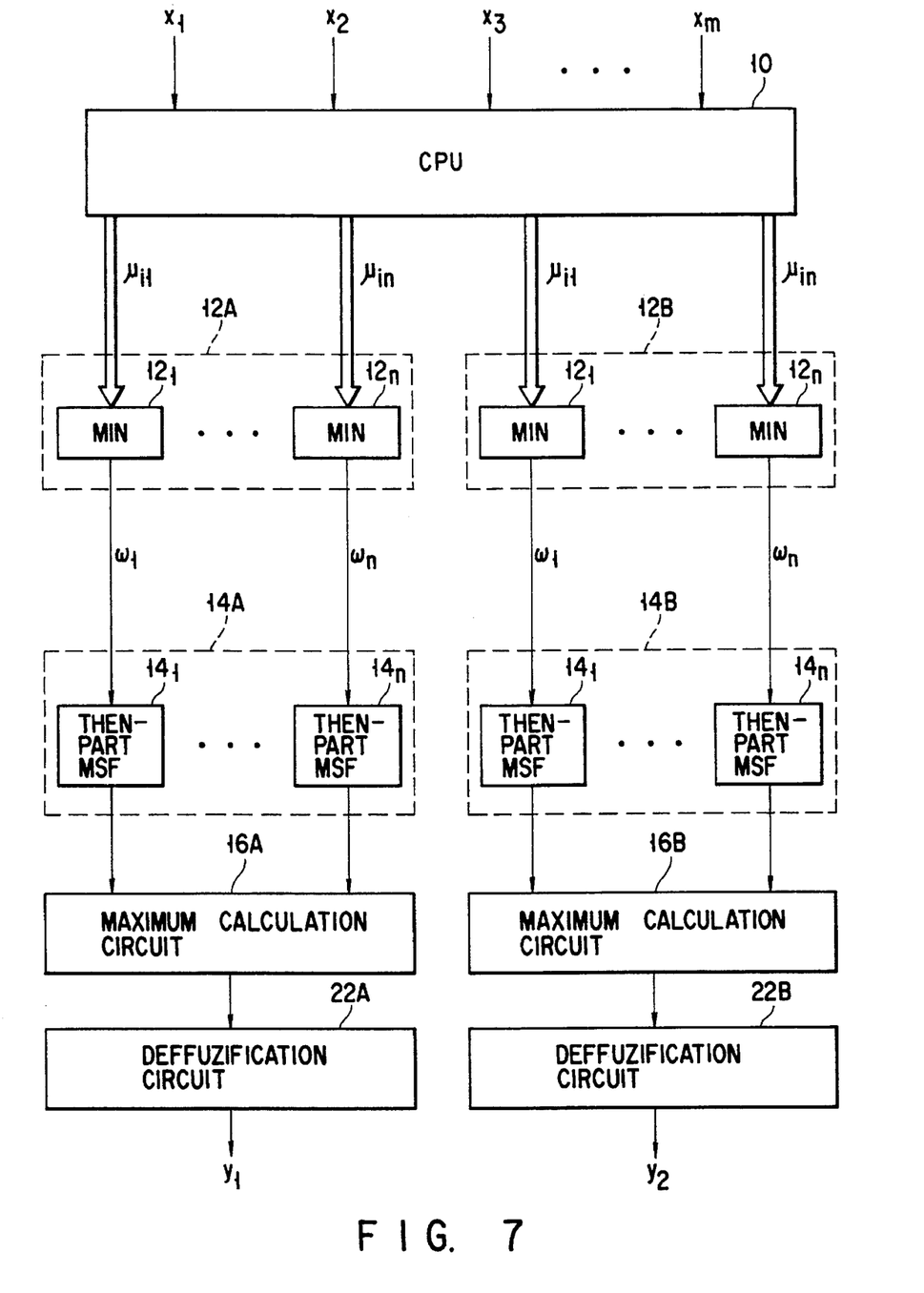
FIG. 7 is a block diagram showing a fuzzy control apparatus as a third embodiment according to the present invention.

FIG. 7 is a block diagram showing a fuzzy control apparatus according to a third embodiment. In the first and second embodiments, the number of the output variable is one. The third embodiment enables to define plural output variables. If the number of the output variables is two, the fuzzy rules defined in the third embodiment is generally expressed as follows.

R1: IF $x_1$ is $A_{11}$ and $x_2$ is $A_{12}$ and ... $x_m$ is $A_{1m}$
    THEN $y_1$ is $B_3$ and $y_2$ is $B_5$ R2: IF $x_1$ is $A_{21}$ and $x_2$ is $A_{22}$ and ... $x_m$ is $A_{2m}$
    THEN $y_1$ is $B_1$ and $y_2$ is $B_2$ ...

Rk: IF $x_1$ is $A_{k1}$ and $x_2$ is $A_{k2}$ and ... $x_m$ is $A_{km}$
    THEN $y_1$ is $B_2$ and $y_2$ is $B_4$ The third embodiment shown in FIG. 7 includes two systems each corresponds to the control apparatus shown in FIG. 5. The output terminals of the CPU 10, the minimum calculation circuit 12, the then-part membership function generation circuit 14, the maximum calculation circuit 16, and the deffuzification circuit 22 are doubled to simultaneously perform the calculations for the two output variables. Alternately, it is not necessary to double the output terminals of the CPU 10, the minimum calculation circuit 12, and the then-part membership function generation circuit 14 if the CPU 10 sequentially outputs the grades of the if-part membership functions to the minimum calculator $12_j$ corresponding to the then-part membership functions and the then-part membership function generator $14_j$ outputs the truth value of the then-parts to the corresponding maximum calculation circuits 16a and 16b.

In the above embodiments, the max-min synthesis method is used as the fuzzy inference method. However, a max-product synthesis method or a sum-product synthesis method can also be used. As an example, the sum-product synthesis method will be described below in comparison with the max-min synthesis method.

Figure 8A:
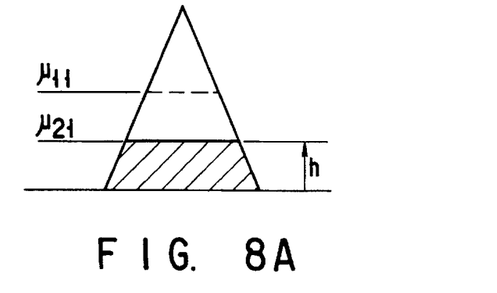
FIGS. 8A and 8B are views showing the comparison of synthesis of if-parts of the fuzzy rules between a max-min inference method and a sum-product method.
Figure 8B:
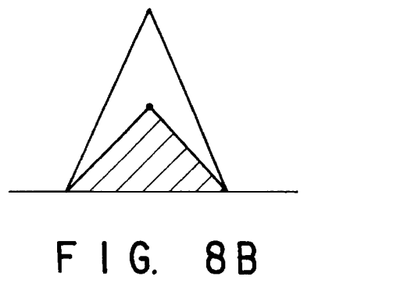

FIG. 8A shows the truth value of an if-part membership function when an inference is performed by the max-min synthesis method, in which a hatched portion indicates a truth value of the if-part membership function. FIG. 8B shows the truth value of an if-part membership function when an inference is performed by the sum-product synthesis method, in which a hatched portion indicates a truth value of the if-part membership function. In the sum-product synthesis method, a product of the grades of the if-part membership functions of all the rules is the truth value of the if-part membership function and the truth value of the then-part membership function of each rule is obtained by multiplying the truth value of the if-part membership function and the then-part membership function.

Figure 9A:
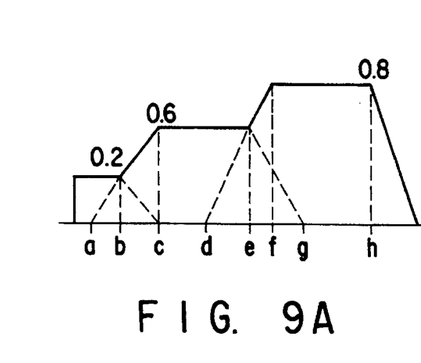
FIGS. 9A and 9B are views showing the comparison of synthesis of then-parts of the fuzzy rules between a max-min inference method and a sum-product inference method.
Figure 9B:
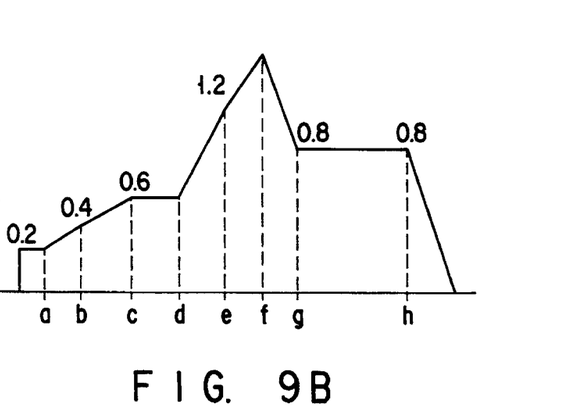

FIGS. 9A and 9B show a method for obtaining the inference result from the then-part membership function based on the max-min synthesis method and the sum-product synthesis method. FIG. 9A shows the then-part membership function synthesis in the max-min synthesis method. FIG. 9B shows the then-part membership function synthesis in the sum-product synthesis method. As shown in FIG. 9B, the sum of the truth value of the then-part membership function is the inference result. In the left portion of a point $a$, no overlapping of membership functions exists. Therefore, if the truth value of then-part membership function B1 is 0.2, the truth value remains 0.2 up to the point a. At a point b, since membership functions B1 and B2 overlap each other, the inference result is 0.2+0.2=0.4. A figure surrounded by a solid line obtained in the same fashion up to a point h.

Figure 10:
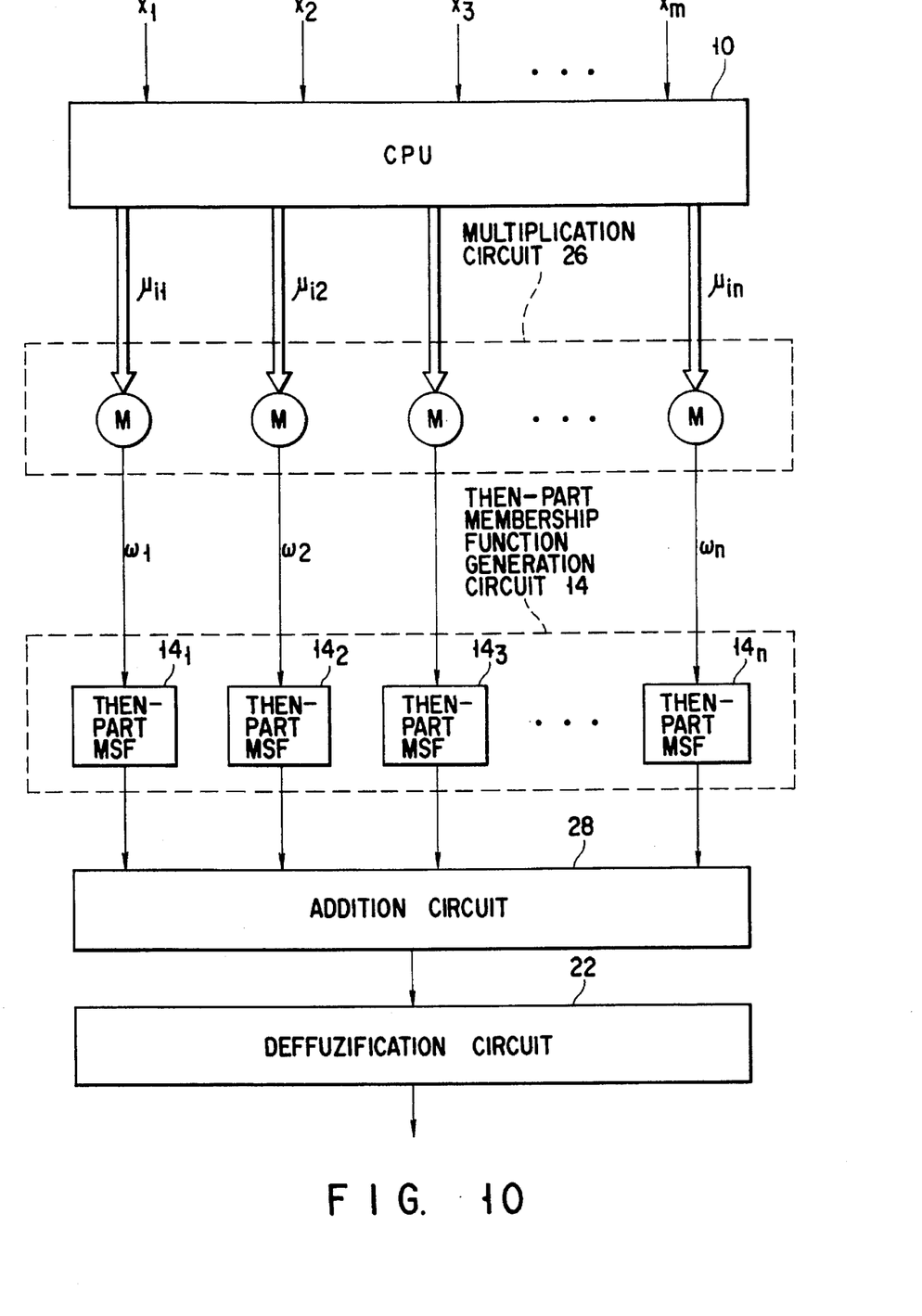
FIG. 10 is a block diagram showing a fuzzy control apparatus based on a sum-product inference method as a fourth embodiment according to the present invention.

FIG. 10 shows a fourth embodiment of a fuzzy control apparatus based on the sum-product synthesis method. The fourth embodiment differs from the second embodiment in that a multiplication circuit 26 and an addition circuit 28 are provided in place of the minimum calculation circuit 12 and the maximum calculation circuit 16.

According to the present invention as has been described above, the calculation speed can be increased significantly without impairing the application flexibility of the system, unlike when whole fuzzy inference calculations are realized by software. That is, conventional fuzzy inference calculations have conflicting problems that, if the calculation speed is increased, the functional flexibility is decreased, and, if the functional flexibility is pursued, the calculation speed is sacrificed. The present invention, however, can eliminate such a conflict to obtain satisfactory results in both the functional flexibility and the calculation speed. In other words, the present invention can realize a fuzzy inference processing apparatus based on an effective system architecture.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, other deffuzification methods may be employed, such as a maximum average method in which the average value of the maximum grade points is calculated, a maximum median method, a median method in which the median point for halving the fuzzy set is calculated, a height method in which a weighted average of the heights of the fuzzy set is calculated, a maximum height method, and a maximum area method.

What is claimed is:

1. A fuzzy inference processing apparatus comprising:

a CPU for calculating m grades of if-part membership functions with respect to m input variables for each rule, the CPU outputs grade of 1 with respect to the input variable which is not defined in the rule;

first synthesizing means, connected to said CPU, for synthesizing the m grades of the if-part membership functions of each rule to obtain a truth value of the if-part of each rule;

calculators for storing then-part membership functions, for receiving the truth value of the if-part of each rule obtained by said first synthesizing means, and calculating a truth value of the then-part of the rule; and second synthesizing means, connected to said calculators, for synthesizing the truth values of the then-part of all the rules to obtain an inference result.

2. A fuzzy inference processing apparatus according to claim 1, wherein said calculators comprises a predetermined number of calculators for respectively storing the then-part membership functions defined in the then-part of the rules;

said first synthesizing means comprises the predetermined number of synthesizers respectively connected to said predetermined number of calculators; and said CPU comprises a central processing unit for supplying the grades of if-part membership functions for each rule to a synthesizer connected to a calculator storing the then-part membership function of the rule.

3. A fuzzy inference processing apparatus according to claim 2, wherein said predetermined number of synthesizers comprises minimum calculators; and said second synthesizing means comprises a maximum calculator.

4. A fuzzy inference processing apparatus according to claim 2, wherein said predetermined number of synthesizers comprises multipliers; and said second synthesizing means comprises an adder.

5. A fuzzy inference processing apparatus comprising:

a CPU for calculating m grades of if-part membership functions with respect to m input variables for each rule, the CPU outputs grade of 1 with respect to the input variable which is not defined in the rule;

first synthesizing means, connected to said CPU, for synthesizing the m grades of the if-part membership functions of each rule to obtain a truth value of the if-part of each rule; calculators for storing then-part membership functions, for receiving the truth value of the if-part of each rule obtained by said first synthesizing means, and calculating a truth value of the then-part of the rule; and second synthesizing means, connected to said calculators, for synthesizing the truth values of the then-part of all the rules to obtain an inference result; and deffuzification means for converting the inference result to a crisp value.

6. A fuzzy inference processing apparatus according to claim 5, wherein said calculators comprises a predetermined number of calculators for respectively storing the then-part membership functions defined in the then-part of the rules;

said first synthesizing means comprises the predetermined number of synthesizers respectively connected to said predetermined number of calculators; and said CPU comprises a central processing unit for supplying the grades of if-part membership functions for each rule to a synthesizer connected to a calculator storing the then-part membership function of the rule.

7. A fuzzy inference processing apparatus according to claim 6, wherein said predetermined number of synthesizers comprises minimum calculators; and said second synthesizing means comprises a maximum calculator.

8. A fuzzy inference processing apparatus according to claim 6, wherein said predetermined number of synthesizers comprises multipliers; and said second synthesizing means comprises an adder.

9. A fuzzy inference processing apparatus according to claim 5, wherein said deffuzification means comprises means for calculating a center-of-gravity of the inference result.

10. A fuzzy inference processing apparatus according to claim 9, wherein said center-of-gravity calculating means comprises:

first calculation means for obtaining a sum of products of outputs of said second synthesizing means and an output variable;

second calculation means for obtaining a sum of the output variable; and means for dividing an output of said first calculation means by an output of said second calculation means.

11. A fuzzy inference processing apparatus comprising:

a CPU for calculating grades of an if-part membership function for each of m input variable and n rules, the grade being 1 for the input variable which is not defined, and the grades for all the input variables being 0 for a rule which is not defined;

n first synthesizers, connected to said CPU, for synthesizing the m grades of the if-part membership functions of each rule to obtain a truth value of the if-part of each rule;

n then-part membership function calculators for receiving the truth value of the if-part of each rule obtained by said n first synthesizers and calculating a truth value of the then-part of each rule; and a second synthesizer, connected to said n then-part membership function calculators, for synthesizing the truth values of the then-part of all the rules to obtain an inference result.

12. A fuzzy inference processing apparatus according to claim 11, wherein said n first synthesizers comprises minimum calculators, and said second synthesizer comprises a maximum calculator.

13. A fuzzy inference processing apparatus according to claim 11, wherein said n first synthesizers comprises multipliers, and said second synthesizer comprises an adder.

14. A fuzzy inference processing apparatus according to claim 11, further comprising:

defuzzification means, connected to said second synthesizer, for converting the inference result to a crisp value.

* * * * *